Patented May 8, 1934

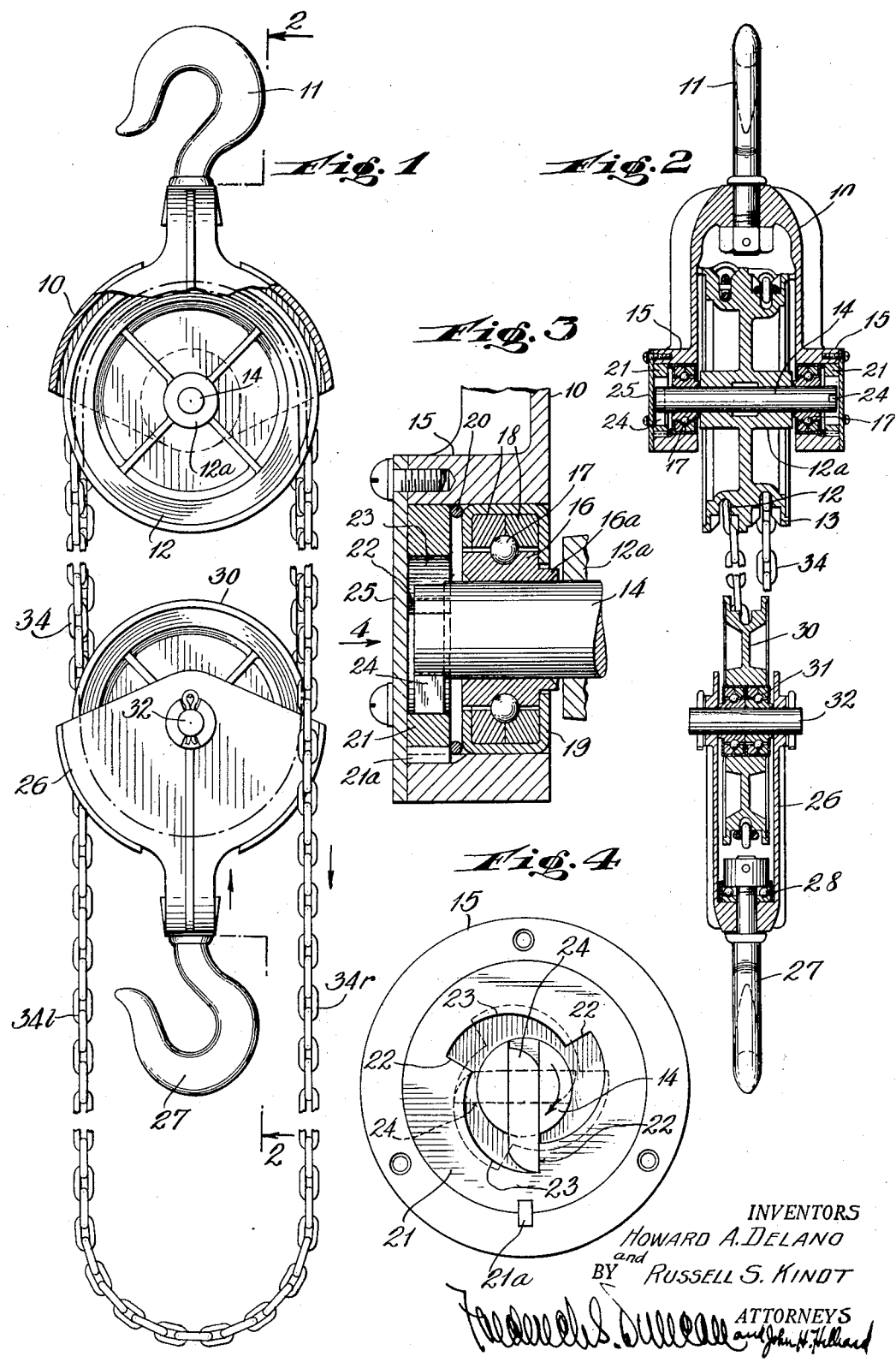

1,957,943

UNITED STATES PATENT OFFICE 1,957,943

DIFFERENTIAL CHAIN HOIST

Howard A. Delano, York, and Russell S. Kindt, West York, Pa., assignors, by mesne assignments, to American Chain Company, Inc., a corporation of New York Application June 15, 1932, Serial No. 617,350

2 Claims. (Cl. 254—169)

The present invention relates to chain hoists of the differential type and has for an object to provide an improved construction yielding a much higher operative efficiency.

A differential chain hoist as heretofore commonly constructed comprises an upper block having twin sprocket wheels, one being smaller than the other, a lower block carrying a hook for the load and provided with a single sprocket wheel, and an endless chain which passes about one of the twin sprocket wheels then about the lower sprocket wheel and thence about the other of the twin sprocket wheels. A powerful lifting leverage is obtained which depends upon the relative diameters of the twin sprocket wheels.

It is often desirable to hold the load in suspension at various levels and in the ordinary hoist there is sufficient friction in the moving parts to keep the load from lowering under its own weight, the actual frictional resistance being multiplied by the leverage provided by the differential twin sprocket wheels. While such friction is desirable for holding a load in suspension it is a handicap when hoisting and the mechanical efficiency of the hoist is materially affected thereby.

An object of the present invention is to increase the mechanical efficiency of the hoist by automatically reducing frictional resistance when hoisting a load and increasing the resistance when lowering the load or when the hoisting is stopped. Thus the load will be held automatically in suspension at any level to which it has been hoisted and the resistance to hoisting of the load will be greatly reduced.

A more specific object of the invention is to provide anti-friction bearings for the sprocket wheels, but by means of suitable mechanism, that comes automatically into play, to introduce frictional resistance which will resist rotation of the twin sprocket wheels in lowering direction.

With the above-named objects in view and others which will appear hereinafter, a preferred embodiment of the invention will now be described and thereafter the novelty and scope of the invention will be pointed out in the claims.

In the accompanying drawing;

Figure 1 is a view in side elevation of the improved hoist with a portion thereof broken away;

Fig. 2 is a view in section taken substantially on the line 2—2 of Fig. 1;

Fig. 3 is an enlargement of a portion of Fig. 2, showing a ball bearing and ratchet mechanism at one end of the shaft of the twin sprocket wheels; and Fig. 4 is an end view of the same looking in the direction of the arrow 4 of Fig. 3, but with a cover plate removed to reveal the ratchet mechanism.

In the drawing, the upper block of the hoist is indicated by the reference numeral 10. This block is provided with the usual attachment hook 11 which has swivel connection therewith. In the block 10 are twin sprocket wheels 12 and 13 which are integrally connected. The sprocket wheel 12 is of larger diameter than the sprocket wheel 13 so as to provide the necessary differential action of the hoist. The sprocket wheels are journaled on a shaft 14 and the latter is mounted in ball bearings carried by hubs 15 formed in the block 10.

In the particular construction illustrated, a bearing collar 16 is fitted upon each end of the shaft 14, and each collar is formed with an annular groove to receive bearing balls 17. An exterior groove for the balls is formed in a split bearing ring 18 and the latter is held in a casing 19 which is driven into the hub 15 of the block 10. The inner face of each collar 16 is formed with an extension 16a which projects through the casing 19 and serves as a stop to limit movement of the hub 12a of the twin sprocket wheels, so as to hold said hub clear of the adjacent casing 19.

Also fitted within each hub 15 but spaced from the adjacent casing 19 by a ring 20 is an annular ratchet plate 21. Each ratchet plate is formed internally with three teeth disposed 120 degrees apart and providing abrupt shoulders 22 connected by arcuate wedge faces 23. Within each ratchet plate is a pin 24 which is free to slide in a slot formed in the adjacent end of the shaft 14. When the shaft is rotated in hoisting direction, that is in the direction indicated by the arrow, in Fig. 4, the pin will slide past the teeth, being reciprocated by gravity and the wedge faces but when the shaft is turned in the opposite direction the first shoulder 22 encountered by the pin will check further rotation of the shaft.

The maximum free motion of the shaft in lowering direction permitted by each ratchet mechanism is 120 degrees. However, the free motion of the shaft can be limited to 60 degrees by offsetting one ratchet mechanism with respect to the other. This may be done by angularly shifting either the pin or the ratchet plate, or both at one end of the shaft with respect to the corresponding parts of the other. I prefer to shift both pin and ratchet plate, the latter being shifted 30 degrees and the pin 90 degrees, so that there is a relative advance in lowering direction of 60 degrees. Such relative position is indicated in Fig. 4, in which the pin and ratchet plate in the foreground are shown in full lines and the corresponding parts at the other end of the shaft are shown in broken lines. The ratchet wheels are secured at the desired relative positions by means of keys 21a. A cover plate 25 covers the end of each hub 15 and serves to retain the adjacent ratchet member 21 in place.

The lower block 26 of the hoist carries a hook 27 adapted to support the load to be hoisted. The hook 27 is mounted to swivel and is preferably provided with a thrust ball bearing 28. Mounted in the block 26 is a single sprocket wheel 30 which is supported on ball bearings 31 carried by a shaft 32 fitted in said block. An endless chain 34 is passed over the sprocket wheel 12, thence downward and under the sprocket wheel 30, thence up and over the sprocket wheel 13. A free run 34r of the chain depends from right hand side of wheel 12, as shown in Fig. 1, and is pulled to raise the hook 27, while the free run 34l of the chain which depends from the left hand side of wheel 13 is pulled to lower said hook.

In operation, owing to the ball bearings in the upper and lower blocks, the sprocket wheels will turn freely in the hoisting direction and the pins 24 will reciprocate idly. When the chain run 34r is released one or the other of the pins 24 will strike a shoulder 22 before the shaft 14 has turned through a maximum of 60 degrees, and the shaft will then be locked against further turning in lowering direction. As a result the load will remain suspended in any desired position because of the friction between the hub 12a and the shaft 14, which resistance, being multiplied by the leverage of the differential sprocket wheels, will serve to support any load for which the hoist is designed. When lowering a load the run 34l of the chain is pulled, turning the twin sprocket wheels counter-clockwise, as viewed in Fig. 1, and since the shaft 14 is held against rotation in this direction by one or the other of the pins 24, the operator must overcome the friction between the hub 12a and the shaft 14. This friction will vary substantially in proportion to the load that is being hoisted, so that the resistance which prevents lowering of the load under its own weight is, in large measure, automatically adjusted to the load.

It will be understood that the particular embodiment shown in the drawing and described above is to be taken as illustrative and not limitative, and that various changes may be made in form, construction and arrangement of parts without departing from the spirit and scope of the invention as set forth in the following claims.

We claim:

1. In a differential chain hoist, a block, integrally connected twin sprocket wheels of different diameters in the block, a shaft on which the wheels are journaled with a friction bearing, anti-friction bearings for the shaft in said block, and ratchet mechanism at each end of the shaft for preventing the shaft from rotating in lowering direction of the hoist, one of said ratchet mechanisms being angularly staggered with respect to the other.

2. In a differential chain hoist, a block, integrally connected twin sprocket wheels of different diameters within the block, a shaft on which the wheels are journaled with a friction bearing, anti-friction bearings for the shaft in said block, said shaft having a slot at each end, a pair of internally toothed ratchet members fixed in the block and into which the slotted ends of the shaft project, a pin slidable in each slot, each ratchet member having shoulders for engaging the pin to arrest rotation of the shaft in lowering direction of the hoist and also having arcuate wedge faces adapted to reciprocate the pin idly when the shaft is turned in hoisting direction.

HOWARD A. DELANO.
RUSSELL S. KINDT.